United States Patent [19]

Citron et al.

[11] Patent Number: 4,930,157
[45] Date of Patent: May 29, 1990

[54] TELEPHONE HANDSET HAVING APERTURES FOR KEY ACCESS

[75] Inventors: Howard Citron, Katonah; Eric Chan; Michael Dolan, both of New York, all of N.Y.

[73] Assignee: Nynex Corporation, White Plains, N.Y.

[21] Appl. No.: 350,095

[22] Filed: May 10, 1989

[51] Int. Cl.$^5$ .............................................. H04M 1/02
[52] U.S. Cl. .................................. 379/433; D14/150; 379/434
[58] Field of Search ............... 379/433, 434, 369, 370, 379/436, 440; D14/150

[56] References Cited

U.S. PATENT DOCUMENTS

| D. 283,127 | 3/1986 | Hai-Ping | D14/150 |
| 4,178,488 | 12/1979 | Nishihata | 379/432 X |
| 4,734,679 | 3/1988 | Haskins | 379/369 |

OTHER PUBLICATIONS

"Siemens Miniset 200-A Compact Telephone for All Locations", Siemens Telcom Report 8, Nov.-Dec. 1985, No. 6, pp. 372-376.

"The GTE Flip-Phone Telephone," W. Ruffer, GTE Automatic Electric Journal, vol. 16, No. 6, Nov. 1978, pp. 214-219.

Primary Examiner—Jin F. Ng
Assistant Examiner—Randall S. Vaas
Attorney, Agent, or Firm—Douglas Kirk; John J. Torrente

[57] ABSTRACT

A handset for use with a key pad wherein the body of the handset is provided with one or more apertures which are adapted to permit access to one or more keys of the key pad when the handset is brought to a position proximate to the key pad.

7 Claims, 3 Drawing Sheets

TELEPHONE HANDSET HAVING APERTURES FOR KEY ACCESS

BACKGROUND OF THE INVENTION

This invention relates to telephone handsets for use with key pads and, in particular, to telephone handsets adapted to minimize the overall space requirements of the handset and key pad.

There are presently available telephones which have been designed to minimize space requirements. In one class of telephones, this has been accomplished by incorporating the telephone key pad into the telephone handset. In one type of telephone of this kind, the key pad is arranged so that the keys are accessible and protrude from the underside of the handset. This design, however, is disadvantageous because it does not allow for on-hook dialing or dialing when the telephone is being cradled. In another type of design, the key pad is accessible from the topside of the handset. Again, this design is not entirely satisfactory because of the lack of accessibility of key pad when the handset is cradled.

It is, therefore, a primary object of the present invention to provide a telephone handset which is adapted to accommodate for limited space requirements but which does not also limit key access.

It is a further object of the present invention to provide a telephone handset for use with a key pad in which space requirements are minimized while key access is permitted at substantially all times, including on-hook and cradling of the handset.

SUMMARY OF THE INVENTION

In accordance with the principles of the present invention, the above and other objectives are realized in a telephone handset by providing in the body of the handset one or more apertures adapted to permit access to one or more keys of the key pad when the handset is brought to a position proximate to the key pad. The keys of the key pad thus become accessible not only when the handset is removed from the key pad and being cradled, but also when the handset is placed on-hook in overlying relationship to the key pad.

In the embodiment of the invention to be disclosed hereinafter, the keys of the key pad are raised from the surface of the pad and the one or more apertures in the body of the handset are adapted to receive the keys which protrude into the one or more apertures. In a first form of this embodiment, the keys extend through the apertures to beyond the body of the handset thereby becoming directly accessible to the user. In another form, actuating means in the form of movably mounted dummy keys are provided in the one or more apertures for accessing the associated keys of the key pad.

BRIEF DESCRIPTION OF THE DRAWINGS

The above and other features and aspects of the present invention will become more apparent upon reading the following detailed description, in conjunction with the accompanying drawings, in which.

DETAILED DESCRIPTION

Figure 1:
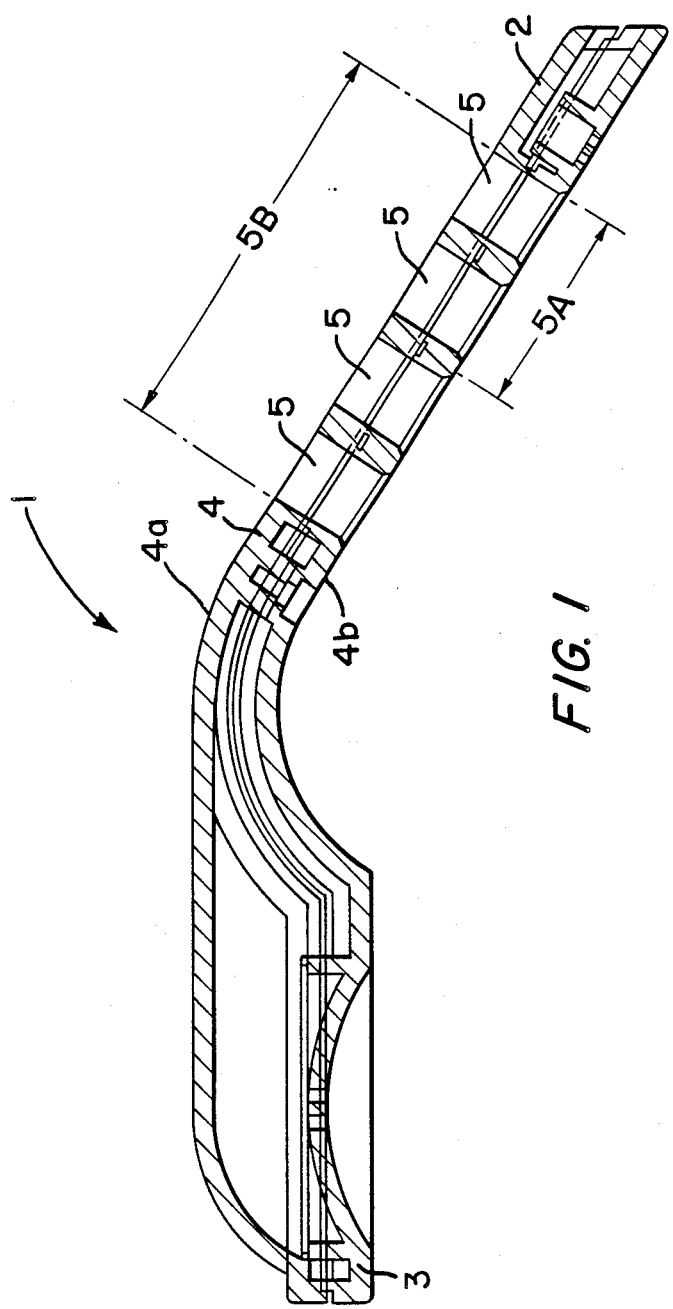
FIG. 1 shows a handset in accordance with the principles of the present invention.

FIG. 1 shows a handset 1 in accordance with the principles of the present invention. The handset comprises a transmitting section 2, a receiving section 3 and a connecting body portion 4. The body portion 4 is provided with a plurality of apertures 5 which extend through the body between the upper and lower surfaces 4a and 4b. The apertures 5 are adapted to permit access to the respective keys 22 of a cooperating key pad 21 shown in FIG. 2 as mounted to a computer terminal 31 or handset base.

Figure 3:
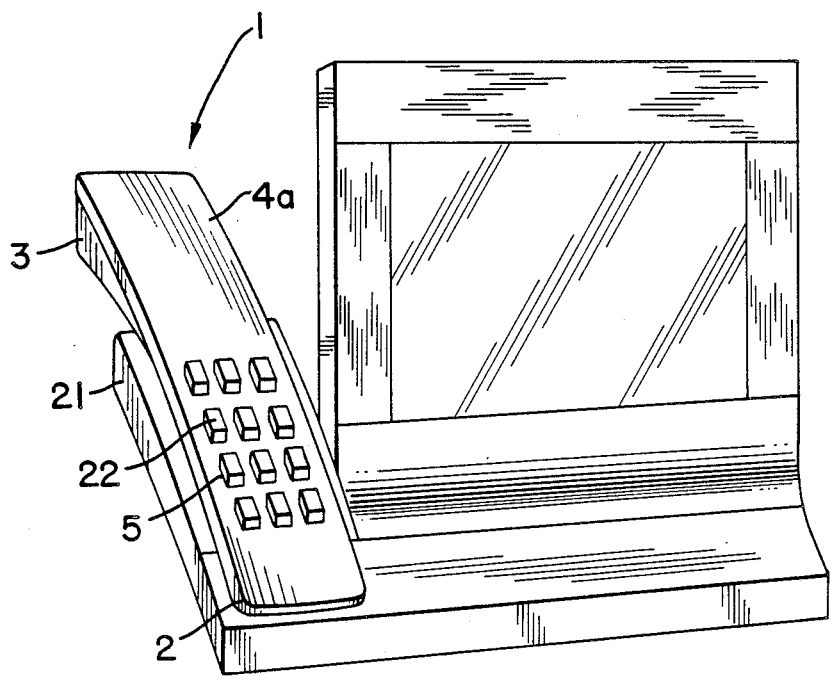

In the present case, the keys 22 are raised and extend or protrude into the respective apertures 5, thereby becoming accessible via the apertures when the handset 1 is placed with the body portion 4 in proximate or adjacent, overlapping relationship to the key pad 21. FIG. 3 illustrates the handset placed in such relationship. As shown, the height of the keys 22 and the thickness of the body 4 are such that the keys 22 protrude into and through their respective apertures to beyond the upper surface 4a of the body. The keys 22 are thus directly accessible to the user with the handset on-hook overlying the key pad 21.

Figure 2:
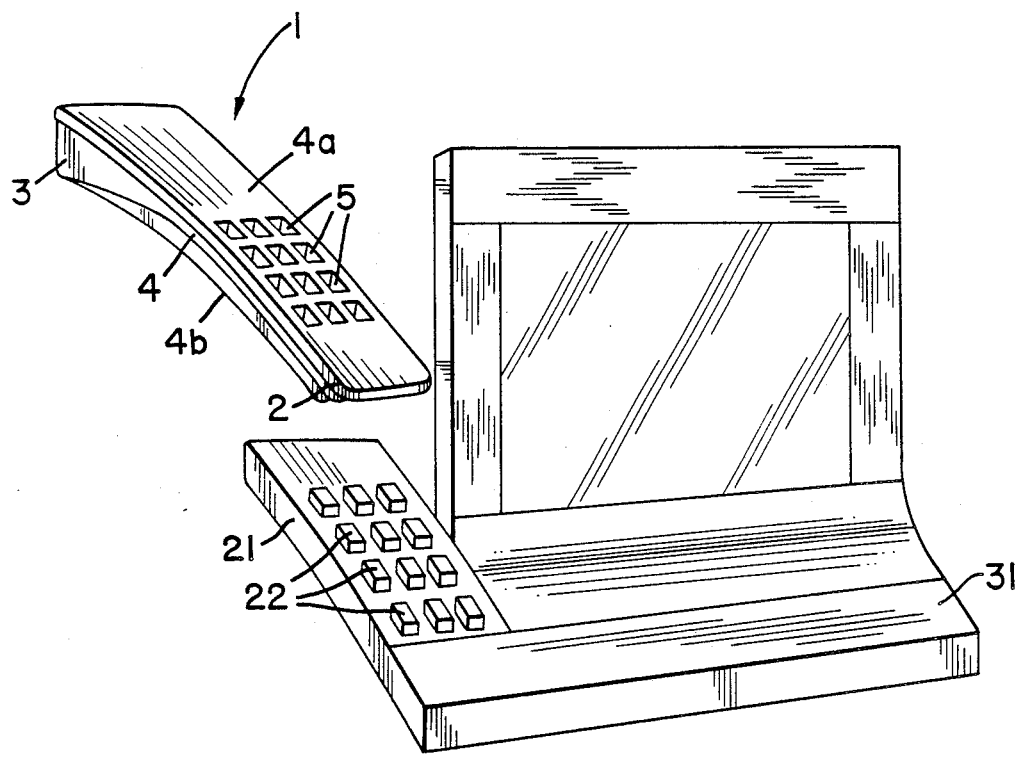
FIGS. 2 and 3 show the handset of FIG. 1 in an off-hook and on-hook condition, respectively relative to a cooperating key pad usable with the handset.

In the illustrated case of FIGS. 1–3, the number of apertures 5 in the body 4 of the handset 1 has been made equal to the number of keys 22 of the key pad 21. In such case, each aperture 5 receives one of the keys 22. However, the handset may be modified such that a single aperture receives more than one key and, if desired, all of keys. Thus, an aperture encompassing the area 5A shown by dotted line in FIG. 1 can be provided to receive several keys or an area 5B also shown by dotted line can be used to receive all the keys.

Figure 4:
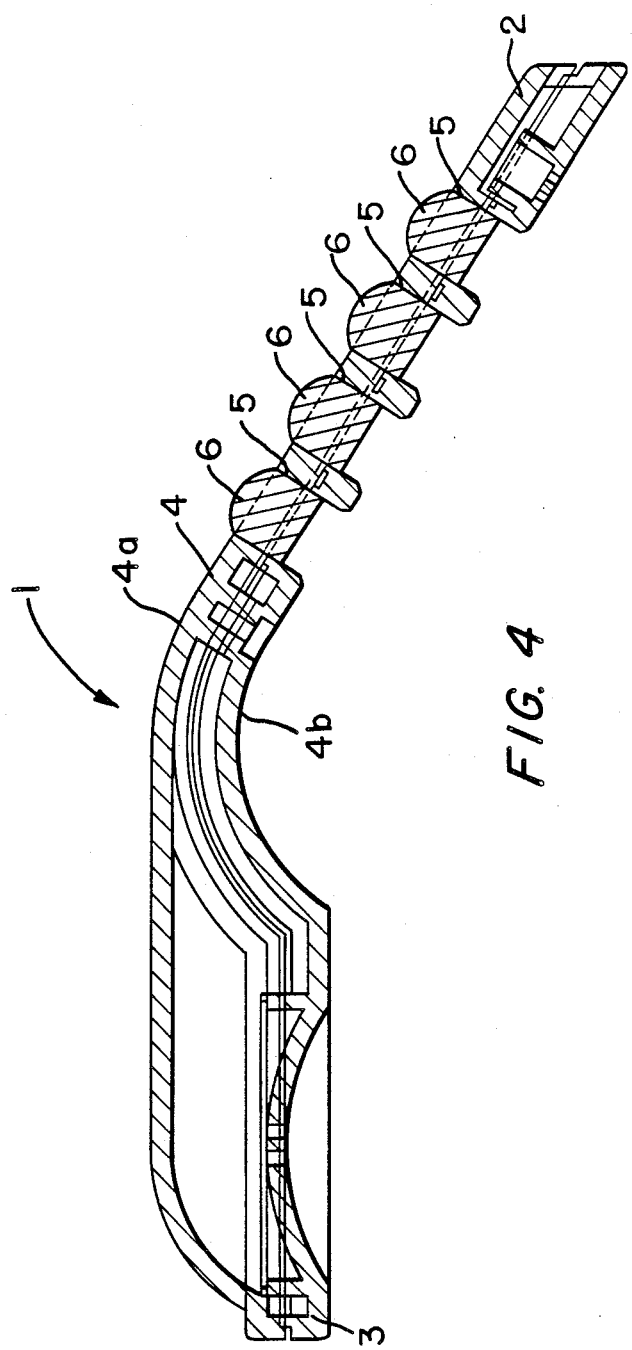
FIG. 4 shows a second embodiment of a handset in accordance with the principles of the present invention.

It is also within the contemplation of the invention that the apertures 5 be provided with actuating means in the form of dummy buttons or keys 6 which are to provide contact with the keys 22 of the key pad 21 associated with the apertures. This is shown in FIG. 4. In this case, the dummy keys 6 are movable mounted in the apertures 5 and actuating of a dummy key results in contact and actuating of a corresponding key 22 of the key 21 pad.

Also, in this case, the keys 22 may be of a height that they protrude into the apertures 5 short of the dummy keys 6 or such that they are sufficiently close to the apertures to be actuatable by the dummy keys.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A telephone handset for use with a telephone key pad having a plurality of keys for key actuated dialing, the handset being separate from the key pad and the keys and being able to be brought to a position proximate to the key pad and the keys, the handset comprising:

a transmitter section;

a receiver section;

a body connecting said transmitter and receiver sections, said body having a plurality of apertures each for permitting access to a different one of the keys of the key pad when said body is brought to a position proximate to the key pad.

2. A telephone handset in accordance with claim 1 further comprising:

a plurality of means each mounted in a different one of said apertures for contacting the key to which that aperture permits access upon actuating of said means by a user.

3. A telephone handset in accordance with claim 2 wherein:

said keys are raised above the surface of said key pad; and said apertures receive the keys which protrude into said apertures short of the contact means mounted in said apertures.

4. A telephone handset in accordance with claim 3 wherein:

each of said contact means comprises a dummy key movably mounted in the aperture associated with that contact means.

5. A telephone handset in accordance with claim 1 wherein:

said plurality of apertures is equal in number to said plurality of keys.

6. A telephone handset in accordance with claim 1 wherein:

each of the keys of the key pad to which access is permitted is raised above the surface of the key pad; and each of said plurality of keys to which access is permitted protrudes into and is received by the aperture permitting access to that key.

7. A telephone handset in accordance with claim 6 wherein:

each of said plurality of keys protrudes through the aperture permitting access to that key to beyond the surface of said body.

* * * * *